(12) United States Patent
Ferranti

(10) Patent No.: US 6,358,729 B1
(45) Date of Patent: Mar. 19, 2002

(54) COMPACT PLANT FOR THE REMOVAL OF ODOROUS SUBSTANCES FROM POLLUTED AIR

(76) Inventor: Massimo Maria Ferranti, Via Ferruccia 40 - 03010, Patrica (Frosinone) (IT)

( * ) Notice: Subject to any disclaimer, the term of this patent is extended or adjusted under 35 U.S.C. 154(b) by 0 days.

(21) Appl. No.: 09/339,684

(22) Filed: Jun. 24, 1999

(51) Int. Cl.⁷ .............................................. C12M 1/12
(52) U.S. Cl. ................. 435/297.1; 435/266; 435/293.1; 55/485; 55/492; 55/512; 55/523; 55/524
(58) Field of Search ............................. 435/266, 293.1, 435/294.1, 297.1, 299.1; 55/485, 490, 492, 512, 523, 524

(56) References Cited

U.S. PATENT DOCUMENTS

| | | | | |
|---|---|---|---|---|
| 5,077,025 A | * | 12/1991 | Glass | 423/245.1 |
| 5,503,738 A | * | 4/1996 | DeFilippi et al. | 210/150 |
| 5,858,768 A | * | 1/1999 | Bonnin et al. | 435/266 |
| 5,891,711 A | * | 4/1999 | Carter | 435/299.1 |
| 6,087,159 A | * | 7/2000 | Finn | 435/299.1 |

FOREIGN PATENT DOCUMENTS

EP          497214 A1 *  8/1992  ................. 435/266

\* cited by examiner

*Primary Examiner*—David A. Redding
(74) *Attorney, Agent, or Firm*—Rosenman & Colin LLP

(57) ABSTRACT

A compact plant for the depuration of polluted air, in particular from odorous substances, comprising a unitary housing in which are placed, in sequence, a prescrubbing section, a filtering bed and a postscrubbing section, in the two scrubbing sections the air flowing counter currently with respect to the water sprayed by suitable nozzles and possibly added with suitable chemical additives, whereas the filtering bed, preferably consisting of particles of the kind described in EP-497214, is sprayed with water added with nutrient substances for the micro-organism present in the bed itself, the water being sprayed flowing co-currently with the air passing through the bed.

11 Claims, 3 Drawing Sheets

COMPACT PLANT FOR THE REMOVAL OF ODOROUS SUBSTANCES FROM POLLUTED AIR

Figure 1:
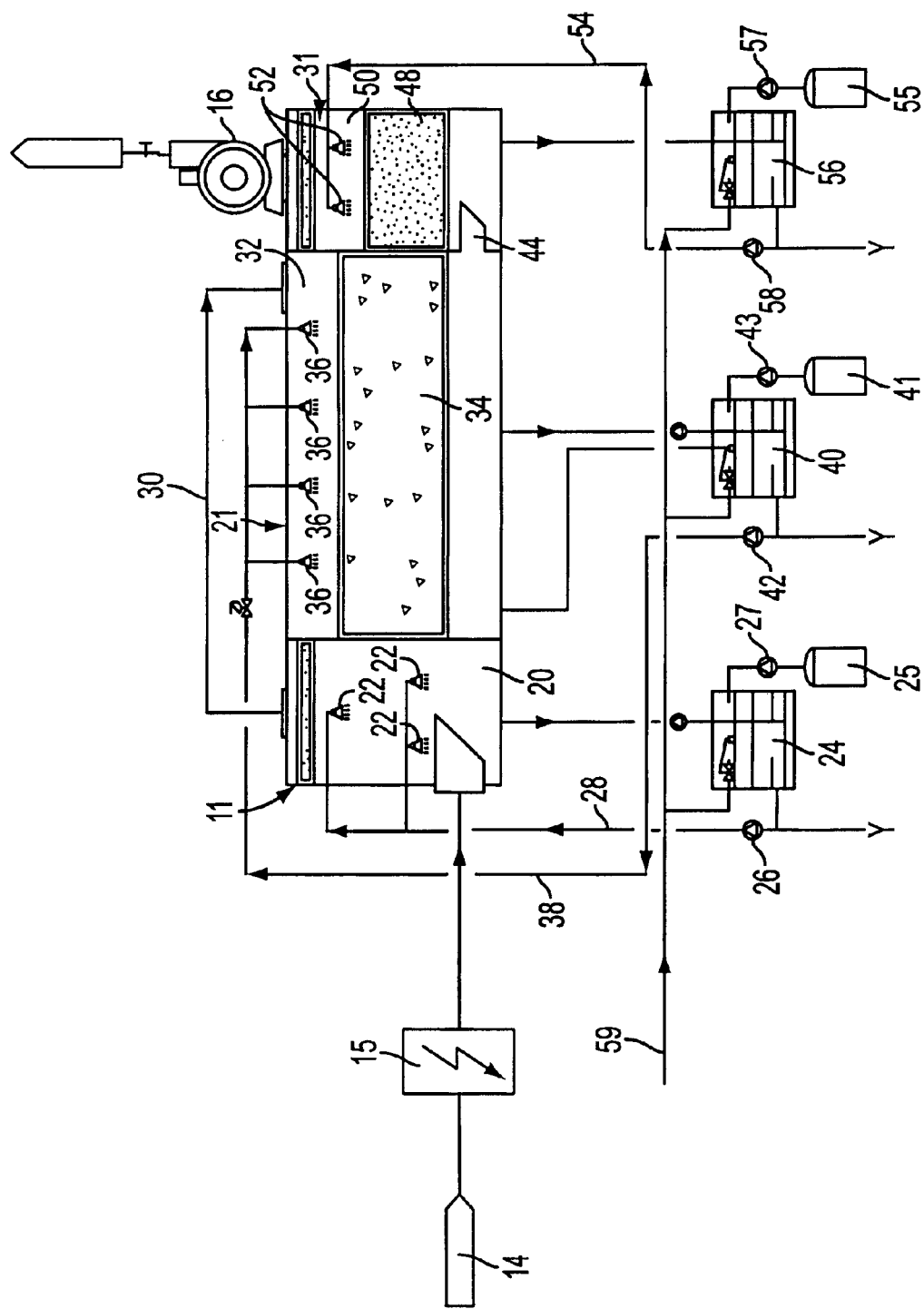

The present invention relates to a plant for the biological depuration of air polluted by odorous compounds, organic and inorganic, particularly for the depuration of air in which the content of polluting odorous substances is rather low but strongly troublesome from the environmental point of view and also the flow rate of the air to be treated is not very high.

In the following specification reference shall be made to odorous substances, mainly meaning substances having bad smell, but it is not to be construed in a limiting sense.

As a matter of fact, the present invention can be successfully applied to the removal of organic volatile substances (O.V.S.), also chlorinated.

It is well known that the pollution of air with odorous substances occurs not only as a consequence of the emissions of heavy industries, such as petrochemical, textile, food and agricultural, paper manufacturing, tanning, fertilising and like industries, but also owing to other industrial activities such as the cattle breeding, slaughtering and mainly the treatment plants for solid garbage and the treatment of emissions of plants for the depuration of town and industrial effluent waters.

A typical case is that of the reclamation of polluted lands (for example by solvents) by means of well known operations (sieving, treatments with soil conditioning compounds, etc.), pursuant to which the surrounding air is polluted with rather low concentrations of polluting substances.

For the depuration of polluted air several technical approaches have been proposed and developed up to industrial use, which can be classified into two main lines, namely the prevention of the pollution (trying to eliminate or at least reduce the contents of polluting substances in the air) and the treatment of the already polluted air.

In the latter case worth of mention is the treatment based on the so-called synergetic biotechnology essentially involving the use of a filtering bed of an inert macroporous adsorbing support, the pores of which contains micro-organisms able to carry out the degradation of the odorous substances, adsorbed by having the polluted air flowing through the filtering bed.

The adsorbing support is coated with a water repellent layer and within the pores optimum conditions (such as humidity, nutrients, temperature and the like) are established for promoting the activity of the said micro-organisms.

This technology is disclosed in the European Patents Nos. 414,095 and 497,214, the content of which is herein recalled for a more detailed information.

A substantial advantage of the treatment process according to this technology is that the polluting substances are destroyed by the action of the micro-organisms and anyhow from the treatment only inert residues are obtained (mainly inorganic salts, water and carbon dioxide) the disposal of which does not need further treatments.

A further advantage of the process of the aforesaid European patents is that it includes, downstream of the above mentioned filtering bed, a further adsorbing and/or absorbing step, wherein polluting substances, not yet removed from the air and destroyed by the action of the micro-organisms, are retained by being adsorbed and subsequently recycled to the treatment in said filtering bed during the dead times of the primary depuration process.

A problem exists in the case of the depuration treatment of air polluted by odorous substances when small flow rates of air are involved (up to 10,000 to 12,000 S.cu.m./hour), since the known plants, independently from the technology upon which they are based, even in the minimum size, are certainly oversized and consequently too much expensive, as regards both the building thereof (which means high investment costs) and the normal operating costs, so that often the problem is put aside.

Typical cases are those of the small sewage treatment plants, collecting pools or lagoons in swine breeding, small paper manufacturing plants, textile dyeing plants, plants for lifting industrial and civil sewages, and the like.

To date this specific technology, characterised by very small operating costs and for the almost total absence of non inert by-products, has not found possible use in the treatment of modest flow rates of polluted air.

The main aim of the present invention is that of providing a plant by which the treatment of polluted air for the depuration from odorous volatile substances in the case small flow rates of air is carried out in an effective and industrially advantageous.

A more specific aim of the present invention is that of providing a plant in form of self-contained and autonomous unit by which polluted air is admitted through a main inlet and automatically undergoes a full depuration, thus coming to the outlet in a condition proper for being returned to the atmosphere, the polluting substances being destroyed or anyhow converted to inert compounds which are disposed without any further problem or need of treatment.

These and other aims are achieved by a the plant in form of autonomous and self-sufficient unit consisting of:

(a) a prescrubbing section, in which the air to be treated is brought to a desired content of water, in particular saturated with water, the scrubbing water being possibly added with chemicals suitable to adjust the pH of the water as a function of the polluting substances contained in the air whereby the scrubbing takes place in conditions close to neutrality or slightly acid;

(b) a biological filter, the air to be depurated flowing through it from the top to the bottom, comprising a bed of macroporous inert particles, the pores of which contain a population of micro-organisms capable of biologically destroying the chemical substances contained in the air passing through the filter, the surface of the filtering bed being preferably coated with an adsorbing substance of hydrophobic nature, the surface of the filtering bed being sprayed in a controlled way with nutrient substances and other possible additives as a solution or dispersion in water, and (c) a postscrubbing section comprising a scrubbing chamber wherein the air undergoes a final washing with water under oxidising conditions, the water being possibly added with suitable compounds suitable to promote such an oxidising effect, the air flow through the plant being caused by a drawing apparatus placed downstream of the postscrubbing section.

In the preferred embodiment of the plant according to the present invention the above components are housed in a compact unitary container-like framework, easy to install and to run, whereby only one inlet for the air to be depurated and only one outlet for the depurated air are provided, the latter being preferably in form of a chimney, the plant further comprising automatic monitoring devices of the air entering the several sections, so as to constantly control the nature and the amounts of chemical additives added to the water fed to the several sections.

Preferably, upstream of the prescrubbing section there is placed a unit for heating the air to be treated, which is brought to a controlled temperature, suitable for promoting the optimum activity conditions of the microorganisms which are present in the biological filter.

Furthermore, an adsorbing bed might also be placed, upstream of the postscrubbing section; said adsorbing bed can be activated in order to remove from the air coming from the biological filter possible polluting substances not demolished or anyhow not separated in the biological filter, for their subsequent elimination, thus preventing not perfectly depurated air from being released in the atmosphere.

In particular, said adsorbing bed can be connected to the prescrubbing section by using, as a vehicle for collecting and recycling the polluting substances, an air flow going through the adsorbing bed itself.

In such a way, the present plant is able to cope also with temporary overloads of polluting substances in the air to be depurated.

Moreover the water fed to the several sections is recycled in the sense of being returned by merely falling back into the tanks from which it is drawn. From the above definition it is clear that the plant of the present invention achieves the results sought for in industrially advantageous manner especially for the treatment of modest flow rates of air polluted by bad smelling substances.

Figure 2:
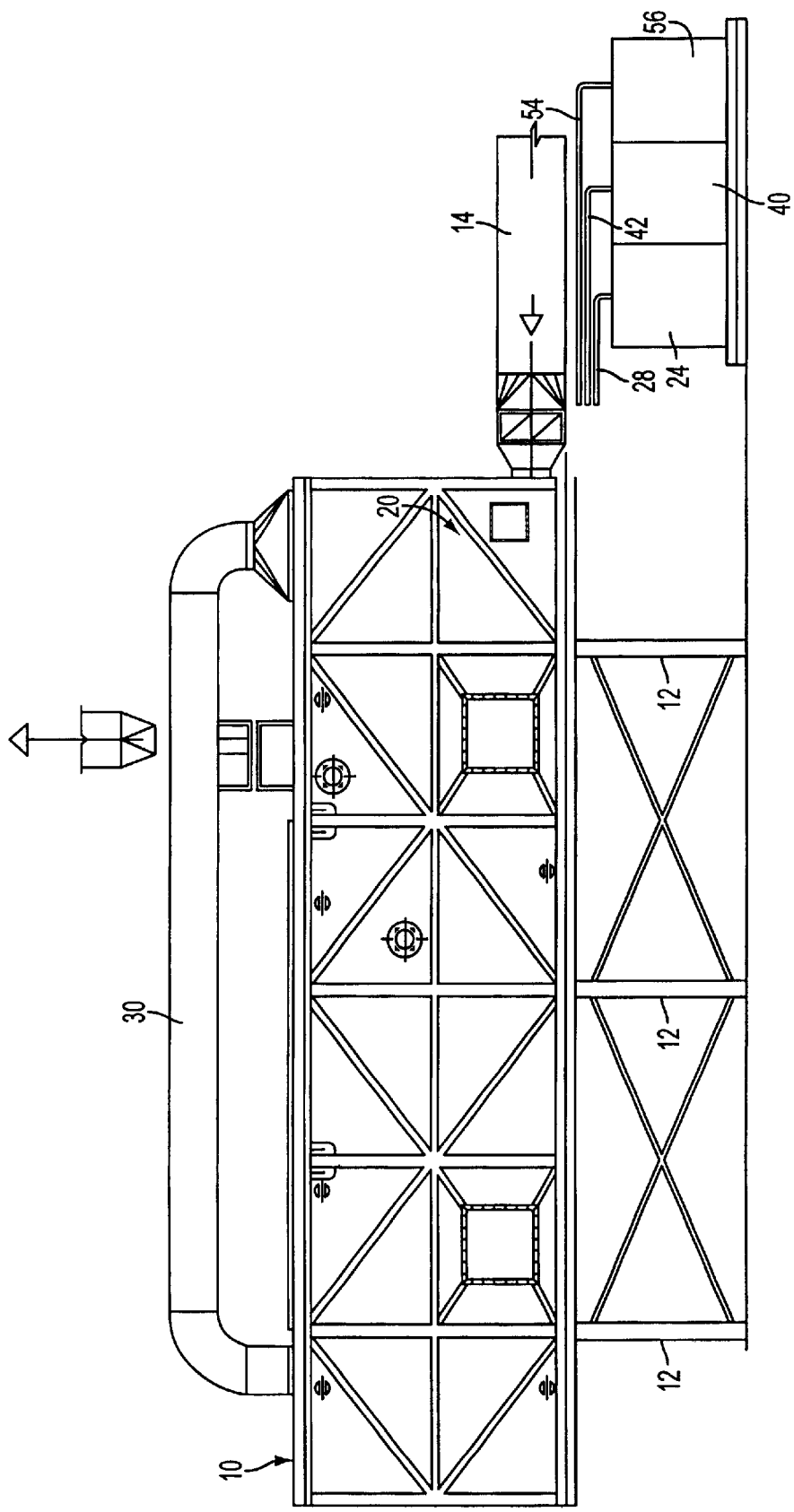
Figure 3:
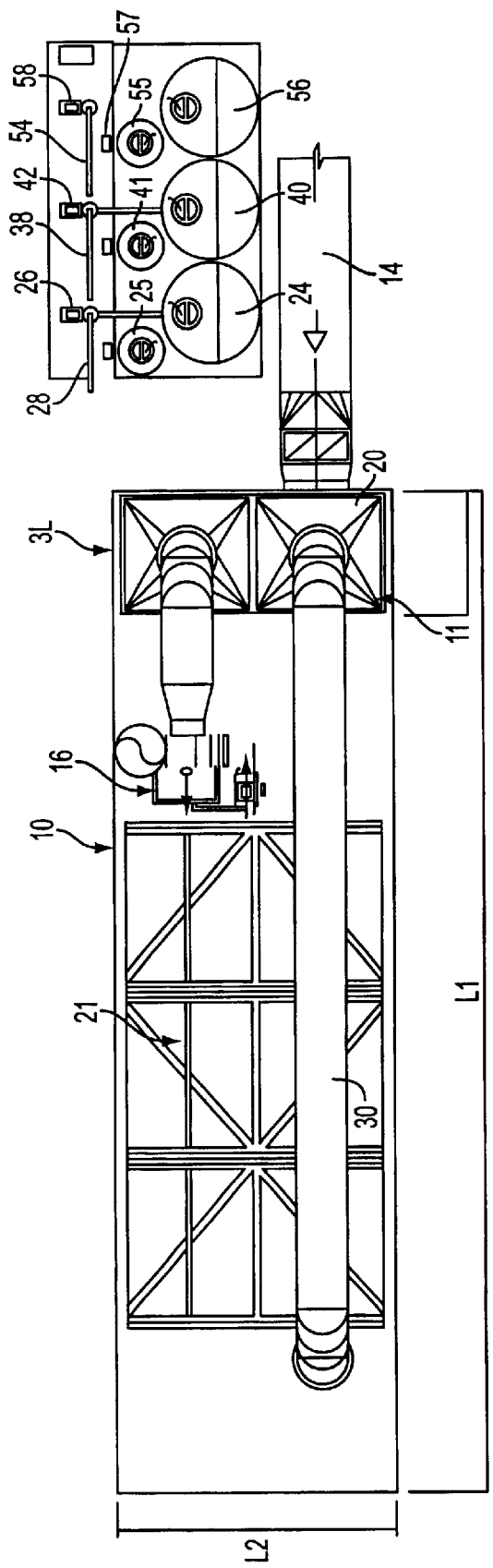

The present invention shall be more clearly understood if reference is made to the following description of a preferred embodiment, with reference to the enclosed drawings, in which:

FIG. 1 shows a process scheme of the operation of the plant of the present invention, FIGS. 2 and 3 are respectively a side view and a plan view from above of the depuration plant of the invention corresponding to the scheme of FIG. 1.

Referring to the figures, the compact plant unit of the present invention comprises a framework or housing 10, preferably supported on pedestals 12. In FIGS. 2 and 3 it is clearly shown that, for reasons of mechanical resistance, the walls of the housing 10 have a slightly pyramidal shape. In substance, the plant according to the invention consists of a prescrubbing section, a biological filter and a postscrubbing section, indicated by the generic references 11, 21 and 31 respectively.

Considering particularly FIG. 1, reference 14 indicates the inlet of the air stream to be depurated, the air flow being promoted by a drawing fan or blower 16, positioned at the opposite end of the housing 10, at this end being placed the outlet of the depurated air.

The blower 16 is preferably equipped with a device regulating the number of revolutions and, consequently, its flow rate, so as to adjust the air flow to the required depuration (further to qualitative and quantitative controls carried out on the air flow to be depurated).

As a matter of fact, if the air contains a high amount of polluting volatile substances the speed of the air getting through the plant shall be lower, in order to ensure a time of permanence in the biologic filter sufficient to allow the micro-organisms present therein to perform their activity.

On the contrary such a speed and flow rate will be remarkably increased for low concentrations of polluting substances.

As regards the blower regulation, this is carried out with standard devices. The air firstly enters a scrubbing section or chamber 20, wherein water is sprayed by means of proper high performance and clogging-proof delivery nozzles 22, fed with water from a tank 24 by means of a pump 26 and a line 28.

The water in the tank 24 is added, depending on the nature of the polluting substances present in the air to be depurated, with chemical additives, preferably either of acidic or of alkaline nature, in order to adjust the pH of the water being suspended in the air stream leaving the scrubber section.

These additives are taken from tank 25 by means of a dosing pump 27, controlled by devices activated by traditional means for measuring the pH of the water leaving chamber 20.

From FIG. 1 it is readily seen that the air is directed upwardly and thus in countercurrent with respect to the falling water sprays.

In chamber 20 a filling bed can be placed in order to increase the scrubbing efficiency.

The air comes out of the scrubber through an upper outlet and, by means of a substantially horizontal pipe 30, preferably slightly inclined towards the prescrubbing chamber 20 to bring back therein possible liquid or solid substances carried by the air, is fed to chamber 32 placed above a filtering bed 34, the air being drawn downwardly through this bed owing to the drawing force of the blower 16.

The filtering bed 34 consists of particles of a material marketed under the trade name BIOSORBENS by the Italian Company CORAIN Impianti Engineering & Contracting S.r.l., this filtering material being in accordance with the European patent No. 497,214.

Shortly stated this filtering material consists of macroporous particles, the pores of which are used as a working seat for biologically oxidising micro-organisms, the particles having a core or nucleus of hydrophilic material coated with a thin layer of hydrophobic material.

In the preferred embodiment said hydrophilic material is porous concrete, expanded clay or pumice stone, whereas the hydrophobic material is active carbon or absorbing resin.

In the chamber 32 above the filtering bed 34, high-performance and clogging-proof spraying nozzles 36 are provided in order to spray the upper surface of the bed with water to keep the bed properly moistened, the water being possibly added with nutrient substances suitable to support the activity of the oxidising micro-organisms.

The nozzles 36 are fed by means of a line 38 connected through a pump 42 with a tank 40.

The water taken from the tank 40 is added with the said nutrient substances taken from a tank 41, by means of a dosing pump 43, under the control both of pH measuring instruments for the water being collected onto the filter bottom and of an automatic programming device adjusted as a function of the type and of the requirements of the microorganisms used in the biological filter.

From the outlet 44 of the filtering section the air passes to a final scrubbing section which, in the figure, is represented in the version comprising a filling bed 48.

In the chamber 50 above the filling bed 48 the air is finally scrubbed by means of water delivery nozzles 52. These nozzles are fed through a line 54 via a pump 58 from a tank 56, the water in the tank 56 being possibly and preferably added with additives suitable to complete the oxidising action of the micro-organisms.

For instance the water of the tank 56 may be added with sodium hydroxide and with an oxidising agent such as hydrogen peroxide or sodium hypochlorite. For these additives a tank 55 is provided associated to a dosing pump 57.

From FIG. 1 it is furthermore appreciated that the water sprayed in the several sections of the compact unit is recovered and directly returned to the corresponding tanks from which it has been taken for feeding the corresponding delivery nozzles.

Only after a great number of operation cycles the water in the tanks is partly or totally substituted with fresh water, which is fed through line 50 which is connected to the single tanks by means of traditional dosing valves.

Preferably in the several sections detecting and measuring devices are provided for specific parameters of the air and/or of the water, giving useful information for the control and the adjustment of the addition of additives as above exemplified to the water tanks.

In particular two series of detecting devices are essential, that is:

(a) a device for continuously detecting the air temperature in each of the three sections into which the plant is substantially divided;

(b) a device for detecting the water pH, in this case too in each of the three sections into which the plant is divided.

The compact unit plant of the present invention is particularly advantageous since its operation and efficiency can be adjusted as a function either of the pollution degree of the air to be treated, namely with respect both to the nature of the polluting substances and to their concentration, and of the process cycles of the plant or process by which the polluting substances are originated.

In general in the case of air polluted with naphtenic diluents, gasoline, xylenes, acetates and other industrial solvents the removal efficiency is higher than 90%, efficiency which can also be of 99% in case of air polluted by substances such as hydrogen sulfide, formaldehyde or aminic and ammonium organic compounds.

Another advantage of the present invention is that the size thereof is tailored on the basis of the flow rate of air to be treated, but the potentiality can be readily increased, if and when necessary, by having recourse to further modules.

The main and very important advantage of the present invention is that the only operation cost is that of the electric energy needed for the operation of the blower 16, since the chemical additives being added to the several tanks for the water fed to the several sections are rather inexpensive and moreover to be added in very small amounts.

Apart from the above-mentioned one, other advantages of not deniable industrial relevance exist.

First of all, the co-current flow conditions of air and moistening water in the biological filter allow a constant and uniform controlled water content of the filter material.

In fact, if the air should flow in countercurrent with respect to the water sprayed onto the upper surface of the filtering bed some operating drawbacks might occur and, in particular, an excessive drying of the lower part of the filtering bed and an oversaturation of its upper layer.

The possibility of adjusting the speed and thus the flow rate of the blower allows to adjust the operation to the so-called day/night cycle, in order to cope with the higher polluting load which is normally present in the air during the day time.

Finally, the compactness of the plant allows an efficient thermal insulation and thus to keep the air at a temperature which promotes the biologic activity. A further contribution is given by the air heating battery which is placed upstream of the plant itself.

The present invention is thus characterised by remarkable advantages over the traditional processes and plants for polluted air purification.

In the following table the dimensional data are reported of a plant according to the invention, in terms of hour flow rate of polluted air to be treated, the dimensions L1, L2 and L3 being respectively, the whole length of the housing 10, the width thereof and the length of the prescrubbing section 20.

| Dimensions (mm) | | | flow rate | specific flow rate | Residing |
| --- | --- | --- | --- | --- | --- |
| L1 | L2 | L3 | (cu.m./h) | (cu.m./sq.m.h) | time (s) |
| 3,000 | 2,500 | 400 | 300/1,500 | 285 | 20 |
| 4,500 | 2,500 | 600 | 500/2,500 | 306 | 20 |
| 6,000 | 2,500 | 800 | 3,000/4,000 | 360 | 20 |
| 9,000 | 2,500 | 1,000 | 5,000/6,000 | 350 | 21 |
| 12,000 | 2,500 | 1,200 | 7,000/9,000 | 390 | 19 |
| 12,000 | 3,000 | 1,200 | 10,000 | 340 | 21 |

From these data it can be readily appreciated that by modestly increasing the dimensions of the housing 10, particularly the length thereof, the capacity of the plant is greatly improved in terms of flow rate of air which can be depurated without any sensible increase of the treating time.

As regards the addition of chemical substances to the water contained in the tanks 24, 40 and 56, their choice as to the nature and to the amounts is depending, as already mentioned, on the characteristics of the air to be depurated and thus of the polluting substances present therein.

For example when ammonia and other basic substances are present in the air at the inlet of the unit, the pH of the recirculating water in the scrubber 20 and thus in the tank 24 is adjusted to a value slightly lower than the neutrality. For instance by adding diluted sulphuric acid the water pH into the tank 24 is brought to a value close but lower than the neutrality, namely to about pH 6.

As regards the nutrients suitable for the activity of the micro-organisms present in the pores of the particles forming the filtering bed, these nutrients are per se well known whereby no further details are necessary.

It should be understood that the above description has exemplifying but non limiting purpose and that conceptually and mechanically equivalent changes and variations are possible and foreseeable without coming out of the scope of the invention.

For example in the above specification reference was made to odorous substances, particularly substances having bad smell, but this is not to be construed as a limitation since the compact unit plant of the present invention can be used for the depuration of the air from polluting substances not necessarily badly odorous but also of different chemical and organic nature, provided that obviously the micro-organisms present in the filtering bed are selected so as to be effective against these substances.

For this purpose, the different micro-organisms which can be used in the plant according to the present invention are here-below listed with respect to the specific polluting substances.

| POLLUTING SUBSTANCES | BACTERIA/MICRO-ORGANISMS |
| --- | --- |
| $CS_2$ + $H_2S$/MERCAPTANS | Thiobacillus TJ330 |
| MERCAPTANS/DIMETHYL SULFIDE | Hyphomicrobium MS3 Pseudonocardia 580,592 |
| TOLUENES/BENZENES/ VARIOUS HYDROCARBONS | Escherichia Coli, Pseudomonas Putida, Mendocina, Aspergillus Fumigatus |
| NO | Nitrobacter |
| STYRENE | Fungy, Rhodococcus |
| 2-METHYLPROPANOL/ ALCOHOLS | Various Pseudomonas, Rhodococcus |

| POLLUTING SUBSTANCES | BACTERIA/MICRO-ORGANISMS |
|---|---|
| CHLORINE HC | Pseudomonas Chlororaphis, Pseudomonas Fluorescens |

Furthermore, although the description of the invention made reference to specific kind of bed of the biologic filter, that is macroporous particles according to EP-497214, it is evident that it is possible and predictable the use of filters made by other materials capable of supporting the biologic purification action of the previously mentioned micro-organisms.

Among these materials the following can be cited: compost, peat, wooden chips, bark, mineral and ceramic granulates, plastic balls, grapes, shells, carbon.

What is claimed is:

1. A compact plant for the depuration treatment of air, polluted by odorous substances, characterised by comprising a unitary framework or housing, containing the following sections:
   (a) a prescrubbing section, in which the air to be treated is brought to a desired content of water, the scrubbing water being possibly added with chemical additives suitable to adjust the pH of the water as a function of the polluting substances contained in the air, so that the scrubbing takes place under conditions close to neutrality;
   (b) a biological filter consisting of a bed of macroporous inert particles containing a population of micro-organisms capable of biologically destroying the chemical substances contained in the air passing through the filter, and
   (c) a postscrubbing section comprising a scrubbing chamber wherein the air undergoes a final washing with water under oxidising conditions, the water being added with compounds suitable to promote such an oxidising effect, the air flow through the plant being caused by a drawing or blowing apparatus placed downstream of the postscrubbing section.

2. A compact plant for the depuration treatment of polluted air according to claim 1, characterised in that said biological filter consists of macroporous inert particles, the pores of which contain said micro-organisms, the surface of said particles being coated with an adsorbing substance of hydrophobic nature, the surface of the filtering bed being sprayed in a controlled way with nutrient substances and other possible additives as a solution or dispersion in water.

3. A compact plant for the depuration treatment of polluted air according to claim 1, characterised in that upstream of said postscrubbing section there is placed an adsorbing bed which can be activated in order to remove from the air deriving from the biological filter possible polluting substances not demolished or anyhow not separated in the biological filter, for their subsequent elimination, thus preventing not perfectly depurated treated air from being released in the atmosphere.

4. A compact plant for the depuration treatment of polluted air according to claim 1, characterised in that in said prescrubbing section the air to be depurated is saturated with water before entering said biological filter.

5. A compact plant for the depuration treatment of polluted air according to claim 1, characterised by comprising a main inlet for the air to be depurated leading to said prescrubber, a drawing or blowing apparatus connected to the outlet of depurated air downstream of said postscrubber, whereby the flow of air from said inlet to said outlet is caused by the operation of said drawing or blowing apparatus only.

6. A compact plant for the depuration treatment of polluted air according to claim 1, wherein in said prescrubber delivery nozzles for recirculating water are provided, which are fed with water drawn from a tank through a pump and a connecting line, said water returning to said tank by direct draining, said tank being possibly added with pH adjusting chemical substances.

7. A compact plant for the depuration treatment of polluted air according to claim 1 characterised in that said filtering bed is fed with water added with nutrients for said micro-organisms present in the particles forming said bed, the water being fed to delivery nozzles and being taken from a tank through a pump and a connecting line.

8. A compact plant for the depuration treatment of polluted air according to claim 1, characterised in that upstream of said postscrubbing section there is placed a heater for the water to be depurated.

9. A compact plant for the depuration treatment of polluted air according to claim 1, characterised in that said drawing or blowing apparatus is equipped with a device regulating the air flow of the drawn air.

10. A compact plant for the depuration treatment of polluted air according to claim 1, characterised by comprising devices for measuring the temperature in said prescrubbing and postscrubbing sections and in said biological filter and devices for measuring the pH of the water fed to said sections and said filter.

11. A compact plant for the depuration treatment of polluted air according to claim 1, wherein in said biological filter the air to be depurated, coming from the prescrubbing section, and the water being sprayed onto the filter flow co-currently.

* * * * *